(12) United States Patent
Deville

(10) Patent No.: US 6,813,835 B2
(45) Date of Patent: Nov. 9, 2004

(54) SECATEURS

(75) Inventor: Antoine Deville, Bauge (FR)

(73) Assignee: Deville SA, Bauge (FR)

( * ) Notice: Subject to any disclaimer, the term of this patent is extended or adjusted under 35 U.S.C. 154(b) by 0 days.

(21) Appl. No.: 10/355,327

(22) Filed: Jan. 31, 2003

(65) Prior Publication Data

US 2003/0150118 A1 Aug. 14, 2003

(30) Foreign Application Priority Data

Feb. 8, 2002 (FR) .............................. 02 01587

(51) Int. Cl.⁷ .............................................. B26B 13/06
(52) U.S. Cl. .......................................... 30/254; 30/357
(58) Field of Search .......................... 30/244, 249, 254, 30/346, 357

(56) References Cited

U.S. PATENT DOCUMENTS

| | | | | |
|---|---|---|---|---|
| 160,102 A | * | 2/1875 | Johnson | 30/254 |
| 2,264,840 A | * | 12/1941 | Isaac | 30/254 |
| 3,055,107 A | * | 9/1962 | Carlberg | 30/254 |
| 4,279,076 A | * | 7/1981 | Jackson | 30/254 |
| 4,422,240 A | * | 12/1983 | Wallace et al. | 30/254 |
| 4,809,433 A | * | 3/1989 | Maxwell et al. | 30/254 |

FOREIGN PATENT DOCUMENTS

| | | |
|---|---|---|
| BE | 843 545 | 10/1976 |
| DE | 19960439 | 6/2001 |
| EP | 0803185 | 10/1997 |
| FR | 19 691 | 5/1915 |
| GB | 2147534 | 5/1985 |
| WO | WO 91/02453 | 3/1991 |

* cited by examiner

Primary Examiner—Hwei-Siu Payer
(74) Attorney, Agent, or Firm—Bachman & LaPointe, P.C.

(57) ABSTRACT

The beveled face of the cutting blade presents, in cross-section and going from its cutting edge: a first zone making a first angle with the plane face of the cutting blade; and a second zone making a second angle with the plane face of the cutting blade, the second angle being smaller than the first angle. The second angle has a minimum value in the region of the cutting blade close to the shoulder and a maximum value in a region of the cutting blade close to the tip of the cutting blade.

10 Claims, 1 Drawing Sheet

SECATEURS

The present invention relates to pruning "shears" or "secateurs" comprising in conventional known manner, a cutting blade mounted to pivot about a pin so as to pivot beside a counter-cutting blade, the cutting blade presenting a plane face beside the counter-cutting blade and a beveled face on its other side extending longitudinally from a shoulder situated close to the pin to the tip of the cutting blade, the beveled face of the cutting blade presenting, in cross-section and going away from its cutting edge, a first zone making a first angle with the plane face of the cutting blade, and a second zone making a second angle with the plane face of the cutting blade, the second angle being smaller than the first angle.

BACKGROUND OF THE INVENTION

In conventional manner, the beveled face is made by machining a plane blank. The first angle and the second angle have values that are constant.

Secateurs of that type generally give satisfaction to their users.

Nevertheless, it is found that the tip of the cutting blade is somewhat fragile and can break when said tip is subjected to excessive twisting forces.

Furthermore, the muscular force that needs to be exerted in order to cut a branch increases very greatly with increasing diameter of said branch since it is necessary to cause the portion of the cutting blade close to the shoulder to penetrate under force into the inside of said branch over its entire section, and the thickness of the cutting blade increases regularly from its cutting edge.

OBJECTS AND SUMMARY OF THE INVENTION

An object of the present invention is to remedy the drawbacks of known secateurs and to propose secateurs of the above-specified type that facilitate cutting branches of large diameter while presenting a tip that presents smaller risk of breakage.

In accordance with the present invention, in secateurs of the above-specified type, the value of the second angle has a minimum value in the region of the cutting blade close to the shoulder and a maximum value in a region of the cutting blade close to the tip of the cutting blade.

Thus, the region of the cutting blade close to the shoulder, which presents a second angle of minimum value and thus a minimum thickness, penetrates more easily into the wood, particularly into the wood of relatively stout branches. In contrast, the region of the cutting blade close to the tip of the cutting blade, in which the second angle has a maximum value, is of maximum thickness, and presents reduced risk of breakage.

In an advantageous version of the invention, the value of the second angle increases, e.g. in substantially regular manner, between the shoulder and the tip of the cutting blade.

In another variant of the invention, the value of the second angle B varies from about 6° close to the shoulder to about 18° close to the tip, and advantageously from about 7° to about 17°, and preferably from about 8° to about 15°.

BRIEF DESCRIPTION OF THE DRAWING

Other features and advantages of the present invention appear from the following detailed description.

In the accompanying drawing given purely by way of non-limiting example.

MORE DETAILED DESCRIPTION

Figure 1:
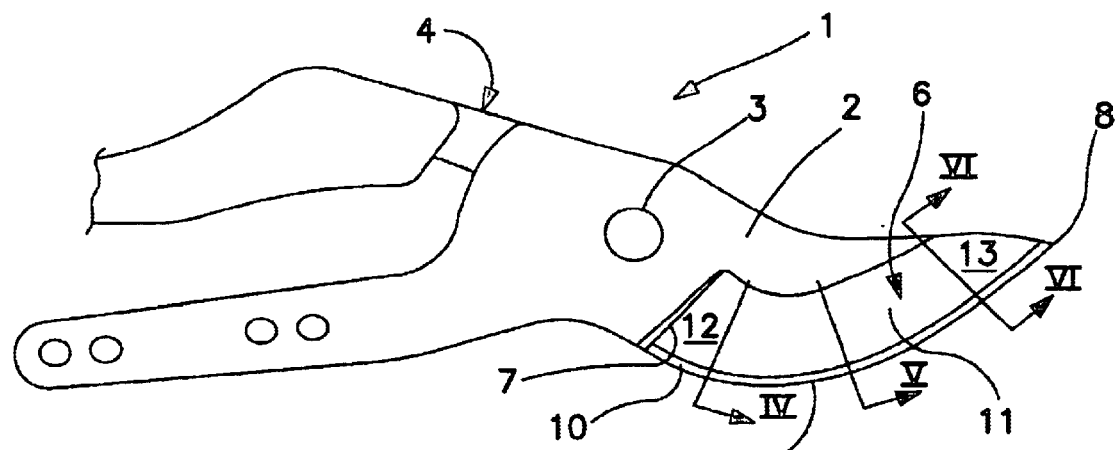
FIG. 1 is a diagrammatic elevation view of the beveled face of the cutting blade of secateurs constituting an embodiment of the present invention.
Figure 2:
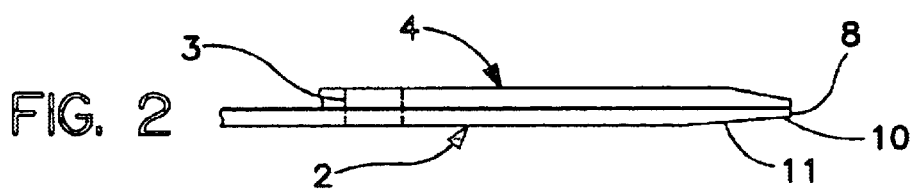
FIG. 2 is a diagrammatic plan view of a portion of the FIG. 1 cutting blade, the counter-cutting blade also being shown diagrammatically in part.
Figure 3:
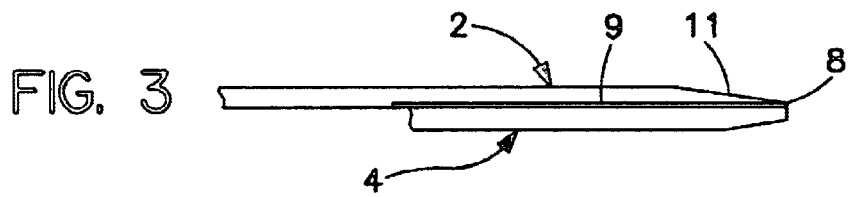
FIG. 3 is a view from beneath of the FIG. 1 cutting blade, the counter-cutting blade also being shown diagrammatically in part.

In the embodiment shown in the figures, the secateurs referenced 1 comprise a cutting blade 2 pivotally mounted about a pin 3 so as to pivot beside a counter-cutting blade 4. Beside the counter-cutting blade 4, the cutting blade 2 has a plane face 5, and on its opposite side it has a beveled face 6 extending longitudinally from a shoulder 7 situated close to the pin 3 to the tip 8 of the cutting blade 2.

As shown diagrammatically in FIGS. 2 to 6, on its beveled face 6, as seen in cross-section, the cutting blade 2 presents, going away from its cutting edge 9: a first zone 10, also referred to as a "counter-taper", at a first angle A relative to the plane face 5 of the cutting blade 2, and a second zone 11, also referred to as a "taper" making a second angle B with the plane face 5 of the cutting blade 2, where the second angle B is smaller than the first angle A.

In conventional manner, the first angle A has a value lying in the range about 17° to about 30°, and preferably in the range 20° to 25°, and in particular being about 22° to 23°, so as to obtain a cutting edge 9 that is as strong as possible.

In conventional manner, the second angle B has a value lying in the range about 10° to about 15°, and is advantageously equal to about 12°.

The cross-sectional shape of the cutting blade is always the result of making a compromise between strength of the cutting blade 2 which is associated with its thickness, and the amount of muscular force that is needed to cause the cutting blade to penetrate into wood, which is likewise an increasing function of the thickness and of the second angle B of the cutting blade.

In accordance with the present invention, the value of the second angle B has a minimum value in the region 12 of the cutting blade 2 close to the shoulder 7, and a maximum value in a region 13 of the cutting blade 2 close to the tip 8 of said cutting blade 2.

Figure 4:
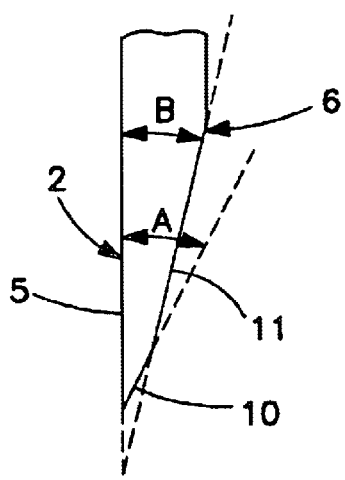
FIGS. 4, 5, and 6 are fragmentary diagrammatic views on a larger scale in section on respective planes IV—IV, V—V, and VI—VI of FIG. 1.
Figure 5:
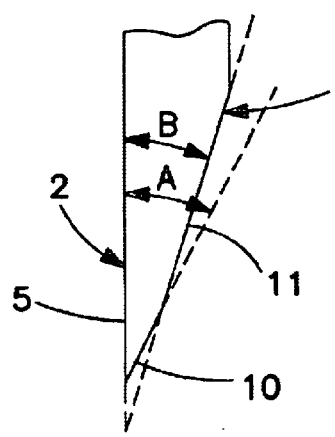
Figure 6:
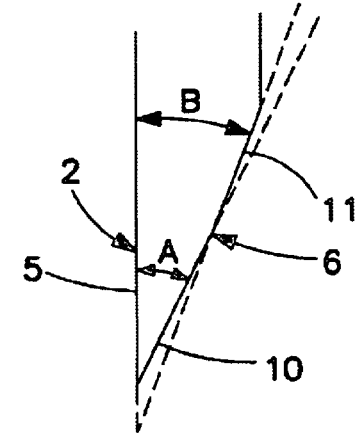

As shown in FIGS. 4 to 6, the value of the second angle B increases, e.g. in substantially regular manner, between the shoulder 7 and the tip 8 of the cutting blade 2.

Thus, the value of the second angle B varies for example between about 6° close to the shoulder 7 and about 18° close to the tip 8, and advantageously between about 7° close to the shoulder 7 and about 17° close to the tip 8.

In the embodiment shown in FIGS. 4 to 6, the angle B shown in FIG. 4 has a value of about 8°, the angle B shown in FIG. 5 has a value in the range about 10° to about 12°, and the angle B shown in FIG. 6 has a value of about 15°.

The value of the angle B can be caused to vary in arbitrary manner between its minimum value close to the shoulder 7 and its maximum value close to the tip 8, for example it can be caused to vary progressively or in successive steps, or by alternating steps with regions in which the value of the angle B increases progressively, or in any other appropriate manner.

Naturally, the first angle A can also be caused to vary between the shoulder 7 and the tip 8 of the cutting blade 2, with such variation being provided in any appropriate manner.

In particular, provision can be made for the angle A to have a relatively large value, e.g. 20° to 27°, and advantageously 22° to 25°, in the region 12 close to the shoulder 7.

It is also possible to provide for the angle A to have a smaller value in the region 13 close to the tip 8, in particular a value of about 15° to about 18°, for example about 17°, equal or substantially equal to the value of the angle B in this region.

Naturally, the present invention is not limited to the embodiments described above, and numerous changes and modifications can be applied thereto without going beyond the ambit of the invention.

What is claimed is:

1. Secateurs comprising a cutting blade mounted to pivot about a pin so as to pivot beside a counter-cutting blade, the cutting blade presenting a plane face beside the counter-cutting blade and a beveled face on its other side extending longitudinally from a shoulder situated close to the pin to the tip of the cutting blade, the beveled face of the cutting blade presenting, in cross-section and going away from a cutting edge, a first zone making a first angle with the plane face of the cutting blade, and a second zone making a second angle with the plane face of the cutting blade, the second angle being smaller than the first angle, wherein the value of the second angle has a minimum value in the region of the cutting blade close to the shoulder and a maximum value in a region of the cutting blade close to the tip of the cutting blade.

2. Secateurs according to claim 1, wherein the value of the second angle increases, between the shoulder and the tip of the cutting blade.

3. Secateurs according to claim 1, wherein the value of the second angle varies from about 6° close to the shoulder to about 18° close to the tip.

4. Secateurs according to claim 1, wherein the value of the first angle also varies between the shoulder and the tip of the cutting blade.

5. Secateurs according to claim 4, wherein the first angle has a value of about 20° to 27° in the region close to the shoulder, and a value of about 15° to 18° in the region close to the tip.

6. Secateurs according to claim 4, wherein the first angle has a value of about 22° to 25° in the region closest to the shoulder and about 17° in the region of the tip.

7. Secateurs according to claim 4, wherein the first angle has a value equal to the value of the second angle in the region close to the tip.

8. Secateurs according to claim 4, wherein the first angle has a value substantially equal to the value of the second angle in the region close to the tip.

9. Secateurs according to claim 1, wherein the value of the second angle varies from about 7° close to the shoulder to about 17° close to the tip.

10. Secateurs according to claim 1, wherein the value of the second angle varies from about 8° close to the shoulder to about 15° close to the tip.

* * * * *